United States Patent [19]  
Gnecco

[11] 3,766,650  
[45] Oct. 23, 1973

[54] SEMI-FINISHED PORCELAIN TEETH
[76] Inventor: Rafael Gnecco, 3820 Waldo Ave., Riverdale, N.Y.
[22] Filed: Oct. 12, 1971
[21] Appl. No.: 188,561

Related U.S. Application Data
[63] Continuation-in-part of Ser. No. 19,522, March 17, 1970, Pat. No. 3,621,576, which is a continuation-in-part of Ser. No. 674,027, Aug. 10, 1967, abandoned.

[52] U.S. Cl. .................................................. 32/8
[51] Int. Cl. ............................................ A61c 13/00
[58] Field of Search ...................................... 32/2, 8

[56] References Cited
UNITED STATES PATENTS
2,463,549   3/1949   Myerson ................................. 32/8
2,380,468   7/1945   Saffir ..................................... 32/8
1,702,212   2/1929   Johnson ................................. 32/8

Primary Examiner—Robert Peshock  
Attorney—James E. Bryan

[57] ABSTRACT

A semi-finished artificial tooth adapted for shaping and mounting in a dental appliance. At least some of the surface areas on the tooth are provided with a rough finish either by etching or by firing the unvitrified tooth to a point below the vitrification temperature of the porcelain wherein the porcelain particles are fused together to form a concretious body. When the tooth is shaped by adding porcelain and is subsequently fired to the vitrification temperature and maintained at this temperature until a glossy smooth surface is obtained, the tooth is vitrified into a monolithic structure.

4 Claims, No Drawings

SEMI-FINISHED PORCELAIN TEETH

CROSS-REFERENCE TO RELATED APPLICATIONS

This is a continuation-in-part of my copending application Ser. No. 19,522, filed Mar. 17, 1970, and now U.S. Pat. No. 3,621,576 which is in turn a continuation in-part of application Ser. No. 674,027, filed Aug. 10, 1967, now abandoned.

BACKGROUND OF THE INVENTION

This invention relates to artificial teeth and, more particularly, to semi-finished artificial porcelain teeth adapted for shaping and mounting in prosthetic dental appliances.

Prosthetic dental appliances for replacing lost or missing teeth are commonly made by dentists and dental technicians from artificial teeth manufactured from porcelain. The dental technician commonly has available large numbers of fully vitrified, glossy and hard commercial porcelain teeth manufactured in different sizes, shapes and colors. The standard procedure for adapting commercial porcelain teeth for prosthetic dental appliances is to initially select a tooth that meets the requirements of the dental patient as closely as possible and to fit the tooth exactly to an appliance for the patient by grinding the tooth and adding porcelain, as necessary. The modified tooth is then fired to fuse the added porcelain, thereby forming a somewhat integral structure. In working with prior art porcelain teeth, the dental technician is dealing with a completely vitrified tooth which is hard and brittle, and therefore difficult to recontour. The surface integrity of the tooth is violated by grinding. When the tooth is modified by the addition of porcelain, only porcelain having a lower fusion point should be used. If the same grade of porcelain material is added to the vitrified tooth, the tooth will probably collapse or melt before the added porcelain material will fuse to it. Because the vitrified tooth is non-porous and the tooth surfaces are smooth, the added porcelain material cannot diffuse into the tooth and the entire finished structure cannot be considered a monolithic entity, even after firing to full vitrification. The tooth will, therefore, tend to crack or chip along the interface between the original porcelain and the added porcelain material.

SUMMARY OF THE INVENTION

According to the present invention, a semi-finished artificial tooth is provided which is particularly suitable for modification prior to mounting in a prosthetic dental appliance. When the tooth is fired to vitrify and to glaze the added porcelain material, a monolithic structure having a strong adhesion at the interface between the original porcelain material and the added porcelain material is formed.

Semi-finished teeth formed in accordance with the present invention have surface areas which are rough and porous. When porcelain is added to the rough, porous surface areas, the added porcelain material diffuses into such surface areas. When the semi-finished tooth is subsequently fired or baked to vitrification, a monolithic structure is formed. The rough surface areas, sections or parts may be formed either by etching surfaces of a semi-finished artificial tooth which has been fully vitrified, or by baking an unvitrified tooth to within about 50°F. of the vitrification temperature.

Accordingly, it is a preferred object of the invention to provide a semi-finished artificial tooth which may be readily modified prior to mounting in a prosthetic dental appliance.

Another object of the invention is to provide a semi-finished artificial tooth which, when modified by the addition of porcelain material and subsequent baking the added material to vitrification, forms a monolithic structure.

Other objects and advantages of the invention will become apparent from the following detailed description.

DESCRIPTION OF THE PREFERRED EMBODIMENTS

According to the present invention, semi-finished artificial teeth are manufactured from colored porcelain materials of the type commonly used in commercial porcelain teeth. The porcelain materials, including an agglutinant or binder, are initially shaped by pressing in a mold which has the general shape of the finished tooth, with allowances made for shrinkage. Prior to removal from the mold, the porcelain dough is dried at a low temperature, such as 400°F., to remove moisture and harden the binder. The green porcelain tooth is referred to as a "biscuit." At this stage of processing the tooth is oversized, water soluble, quite brittle and easily damaged by careless handling. Prior to sale of the semi-finished artificial tooth to dentists and dental technicians, the tooth is hardened and provided with surface areas which are dull, strong, porous and waterproof. These surface areas may cover the entire semi-finished tooth or only surface areas which are to be modified.

In a first embodiment of the invention, the semi-finished tooth is hardened by firing or baking the biscuit above 1,200°F. to a hard concretious state, but below the vitrification temperature. In this state, the porcelain is insoluble to water and resistant to damage. Surfaces of the porcelain are, however, rough and porous. In addition, the tooth has shrunk as much as 50 percent to substantially the same size which it will have when the porcelain is fired to a fully vitrified state. A semi-finished tooth of this type is readily modified for mounting in a prosthetic dental appliance. Teeth of this type may be sold to dental technicians and dentists who will shape the semi-finished tooth to the needs of a patient by grinding and by the addition of porcelain of the same fusion point. After shaping, the tooth is fired to the fusion point for the particular porcelain, such as 1,900°F. or 2,300°F., or more for many porcelains, to fully vitrify both the original porcelain in the semi-finished tooth and the added porcelain. The tooth is soaked at this temperature until the tooth surfaces are glazed. THe fully vitrified and glazed tooth will then form a monolithic structure with a strong bond at the interface between the original porcelain and the added porcelain material.

In a second embodiment of the invention, the biscuit is fired to full vitrification. After vitrification, at least some surface areas of the tooth are made rough and porous by etching. Etching may be accomplished by means of a chemical which attacks the porcelain, such as hydrofluoric acid, or etching may be accomplished mechanically, as by sand blasting. The etched surface areas of the artificial porcelain tooth are rough and suitable for modification by the addition of porcelain material. Porcelain material added to the artificial tooth will diffuse into the etched surfaces. When the tooth is subsequently fired to vitrify the added porcelain material, a monolithic structure is formed. The bond at the interface between the original porcelain tooth and the added material is much stronger than when porcelain is added to smooth surfaces on a fully vitrified artificial tooth.

It will be appreciated that various modifications and changes may be made in semi-finished artificial teeth without departing from the spirit and the scope of the claimed invention.

What I claim is:

1. A semi-finished artificial tooth adapted for shaping by the addition of porcelain material and for subsequent mounting in a dental appliance comprising a body of porcelain baked to a concretious non-vitrified state wherein shrinkage of the green porcelain material is substantially complete, at least some of the surface areas of said body having the approximate size and shape of a finished tooth, and at least some of the surface areas of said body further having a rough porous finish adapted, when fired to the vitrification temperature of the porcelain, to bond into a monolithic structure with additional porcelain material applied to such surface areas when shaping the semi-finished tooth.

2. A semi-finished artificial tooth adapted for shaping by the addition of porcelain material and for subsequent mounting in a dental appliance, as set forth in claim 1, wherein the porcelain on said rough finished surface areas is chemically etched.

3. A semi-finished artificial tooth adapted for shaping by the addition of porcelain material and for subsequent mounting in a dental appliance, as set forth in claim 1, wherein the porcelain on said rough finished surface areas is mechanically etched.

4. A semi-finished artificial tooth adapted for shaping by the addition of porcelain material and for subsequent mounting in a dental appliance, as set forth in claim 1, wherein said porcelain body has been fired at a temperature above 1,200°F. and below the vitrification temperature of the porcelain in said body.

* * * * *